United States Patent
Sonoda

(10) Patent No.: US 10,126,734 B2
(45) Date of Patent: Nov. 13, 2018

(54) SERVO CONTROL APPARATUS FOR DRIVING PLURALITY OF MOTORS

(71) Applicant: FANUC CORPORATION, Yamanashi (JP)

(72) Inventor: Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/468,655

(22) Filed: Mar. 24, 2017

(65) Prior Publication Data
US 2017/0293287 A1    Oct. 12, 2017

(30) Foreign Application Priority Data

Apr. 12, 2016   (JP) ................................ 2016-079691

(51) Int. Cl.
| | |
|---|---|
| G05B 13/02 | (2006.01) |
| G05B 19/19 | (2006.01) |
| G05B 19/31 | (2006.01) |
| G05B 19/416 | (2006.01) |

(52) U.S. Cl.
CPC .. G05B 19/416 (2013.01); *G05B 2219/34013* (2013.01); *G05B 2219/42186* (2013.01)

(58) Field of Classification Search
CPC ....... G05B 13/021; G05B 19/19; G05B 19/31
See application file for complete search history.

(56) References Cited

U.S. PATENT DOCUMENTS

| | | | | |
|---|---|---|---|---|
| 4,843,291 A * | 6/1989 | Predina | ................. | G05B 19/33 318/603 |
| 2003/0111973 A1 | 6/2003 | Iwashita et al. | | |
| 2006/0186845 A1* | 8/2006 | Terada | ................. | G05B 19/19 318/432 |
| 2010/0231158 A1* | 9/2010 | Jonsson | ............... | G05B 19/258 318/609 |
| 2013/0134919 A1* | 5/2013 | Takayama | ............ | G05B 19/416 318/625 |
| 2015/0022137 A1* | 1/2015 | Maeda | ................. | G05B 13/021 318/632 |

FOREIGN PATENT DOCUMENTS

| | | |
|---|---|---|
| JP | 2003-131712 | 5/2003 |
| JP | 3537416 | 3/2004 |

(Continued)

*Primary Examiner* — Bentsu Ro
*Assistant Examiner* — Cortez Cook
(74) *Attorney, Agent, or Firm* — Wenderoth, Lind & Ponack, L.L.P.

(57) ABSTRACT

A servo control apparatus which includes: a difference calculation unit that calculates difference between an integral value of speed deviation of a master axis and an integral value of speed deviation of a slave axis; a filter unit that performs filtering of the difference by way of a low-pass filter; and an addition unit that adds a result of the filtering to the integral value of the speed deviation of the slave axis, in which a current command for driving the master-axis motor is calculated for the master axis by using the integral value of the speed deviation of the master axis; and a current command for driving the slave-axis motor is calculated for the slave axis by using an integral value after addition by way of the addition unit.

4 Claims, 8 Drawing Sheets

(56) References Cited

FOREIGN PATENT DOCUMENTS

| | | |
|---|---|---|
| JP | 2004-310261 | 11/2004 |
| JP | 2007-042068 | 2/2007 |
| JP | 2007-060864 | 3/2007 |
| JP | 2009-83074 | 4/2009 |
| JP | 2009083074 A * | 4/2009 |
| JP | 5642848 | 11/2014 |

* cited by examiner

SERVO CONTROL APPARATUS FOR DRIVING PLURALITY OF MOTORS

This application is based on and claims the benefit of priority from Japanese Patent Application No. 2016-079691, filed on 12 Apr. 2016, the content of which is incorporated herein by reference.

BACKGROUND OF THE INVENTION

Field of the Invention

The present invention relates to a servo control apparatus for controlling a servomotor; in particular, the present invention relates to a servo control apparatus that performs control when driving a driven object by way of a plurality of servomotors.

Related Art

In a drive mechanism for various machines such as robots, machine tools, injection molding machines, and press machines, tandem control has been conventionally utilized in the cases where a large-sized driven object as a movement target cannot be accelerated or decelerated by way of a single servomotor for driving the movement axis, or in the cases where a driven object cannot be moved in a stable state due to a large backlash between the driven object and the machine elements of a transfer mechanism connected to the drive axis of the motor. In such tandem control, a move command is provided to a plurality of servomotors, and one driven object is driven by way of the plurality of servomotors. As a result, a large-sized driven object can be driven, or a driven object can be moved in a stable state.

In such tandem control, any one of the plurality of servomotors functions as a main servomotor having a drive axis serving as a master axis connected to a transfer mechanism (hereinafter referred to as "master-side servomotor" as appropriate), and other servomotors function as sub servomotors having a drive axis serving as a slave axis connected to the transfer mechanism (hereinafter referred to as "slave-side servomotor" as appropriate). In this case, when each servomotor of the master side and the slave side repeats acceleration or deceleration, due to causes such as each servomotor receiving speed feedback at different timing, integral values of integral elements of speed control units of the servomotors may be diverted from each other. In this manner, if the integral values of the servomotors are diverted from each other, the controllability of the servomotors may be deteriorated, and an excessive torque command may be provided, which may overheat the servomotors.

A technology to solve this problem has been disclosed in Patent Document 1. The technology disclosed in Patent Document 1 performs control such that an integral value of a speed integrator of the slave side will be identical to an integral value of a speed integrator of the master side. Specifically, a torque command value for the master-side servomotor as well as a torque command value for the slave-side servomotor are generated by using an integral value of speed deviation that is the difference between the speed command value and the speed of the master-side servomotor. In this manner, the problem of divergence of integral values between servomotors can be solved. However, if the integral values of the speed integrators of the master side and the slave side are constantly identical to each other in this manner, when mainly the slave-side servomotor is driven, namely, when acceleration of the master-side servomotor takes a negative value, position deviation will increase between the position command value and the position of the servomotor, causing adverse effects on the control of the servomotors, resulting in unstable control.

A technology, which is further improved in view of this drawback, has been disclosed in Patent Document 2. In order to solve the problem that occurs when mainly the slave-side servomotor is driven, the technology disclosed in Patent Document 2 selects one of the speed integrators of the master side and the slave side in accordance with the direction of acceleration, such that the integral value of the selected speed integrator is identical to the integral value of the other speed integrator. Namely, the copy source of the integral value is switched between the master side and the slave side in accordance with the direction of acceleration. As a result, when mainly the slave-side servomotor is driven, the integral value of the speed integrator of the master-side servomotor can be identical to the integral value of the speed integrator of the slave-side servomotor, and the problem arising from the configuration disclosed in Patent Document 1 can be solved.

Patent Document 1: Japanese Patent No. 3537416
Patent Document 2: Japanese Patent No. 5642848
Patent Document 3: Japanese Unexamined Patent Application, Publication No. 2009-83074

SUMMARY OF THE INVENTION

As set forth above, by utilizing the technologies disclosed in Patent Document 2, etc., the integral values of the speed integrators of the master side and the slave side can be constantly identical to each other in accordance with the direction of acceleration. However, if the integral values are constantly identical to each other regardless of performing movement with quick acceleration or deceleration, when the mechanical coupling rigidity between the driven object and the master-side axis and the slave-side axis is low, the driven object may be elastically deformed, causing problems such as "flexure" or "torsion" of the driven object, losing appropriate control of the driven object, which in turn creates another drawback.

In line with this, it is an object of the present invention to provide a servomotor control apparatus capable of adjusting an integral value of a speed integrator, while maintaining the controllability in relation to a driven object.

(1) A first aspect of the present invention is a servo control apparatus (e.g., a speed control unit 100 to be described later), which performs control for driving one driven object (e.g., a driven object 8 to be described later) by way of a master-axis motor (e.g., a first servomotor 6-1 to be described later) on a master axis, and a slave-axis motor (e.g., a second servomotor 6-2 to be described later) on a slave axis, in which the apparatus includes: a difference calculation unit (e.g., a subtractor 31 to be described later) that calculates difference between an integral value of speed deviation of the master axis and an integral value of speed deviation of the slave axis; a filter unit (e.g., a low-pass filter 32 to be described later) that performs filtering of the difference by way of a low-pass filter; and an addition unit (e.g., an adder 33 to be described later) that adds a result of the filtering to the integral value of the speed deviation of the slave axis, in which a current command for driving the master-axis motor is calculated for the master axis by using the integral value of the speed deviation of the master axis; and a current command for driving the slave-axis motor is calculated for the slave axis by using an integral value after addition by way of the addition unit.

(2) The servo control apparatus according to the first aspect may further include: a master axis control unit (e.g., a subtractor 11, an integrator 12, a proportional gain amplifier 13, an integral gain amplifier 14, and an adder 15 to be described later) corresponding to the master-axis motor, in which the master axis control unit calculates speed deviation of the master-axis motor corresponding to the control unit, based on a speed command being common to the master axis and the slave axis, and speed feedback of the master-axis motor corresponding to the control unit; and the master axis control unit calculates a sum of a value obtained by multiplying a proportional gain by the speed deviation calculated, and a value obtained by multiplying an integral gain by an integral value obtained by integrating the speed deviation calculated, as a current command for driving the master axis corresponding to the control unit; and a slave axis control unit (e.g., a subtractor 21, an integrator 22, a proportional gain amplifier 23, an integral gain amplifier 24, and an adder 25 to be described later) corresponding to the slave-axis motor, wherein the slave axis control unit calculates speed deviation of the slave-axis motor corresponding to the control unit, based on a speed command being common to the master axis and the slave axis, and speed feedback of the slave axis motor corresponding to the control unit; and the slave axis control unit calculates a sum of a value obtained by multiplying a proportional gain by the speed deviation calculated, and a value obtained by multiplying an integral gain by an integral value after addition by way of the addition unit, as a current command for driving the slave axis corresponding to the control unit.

(3) In the servo control apparatus according to the first or second aspect, the slave axis may include N slave axes (N is a natural number of 2 or more); the difference calculation unit, the filter unit, and the addition unit may each include N units thereof corresponding to the N slave axes; each of the N difference calculation units may calculate difference between the integral value of the master axis and the integral value of the slave axis corresponding to the difference calculation unit; each of the N filter units may perform filtering of the difference in relation to the slave axis corresponding to the filter unit by way of a low-pass filter; each of the N addition units may add a result of the filtering of the slave axis corresponding to the addition unit, to the integral value of the slave axis corresponding to the addition unit; whereby a current command for driving the slave-axis motor may be calculated for each of the N slave axes by using an integral value after addition by way of the addition unit corresponding to the slave axis.

(4) It may be further preferable that the servo control apparatus according to any one of the first to third aspects further includes an estimation unit (e.g., a rigidity estimation adjustment unit 40 to be described later) that estimates mechanical coupling rigidity between the master axis and the slave axis, in which a cutoff frequency of the low-pass filter may be adjusted based on an estimated result of the estimation unit.

(5) In the servo control apparatus according to the fourth aspect, it may be further preferable that the cutoff frequency of the low-pass filter is adjusted to be high when the mechanical coupling rigidity between the master axis and the slave axis is high; and the cutoff frequency of the low-pass filter is adjusted to be low when the mechanical coupling rigidity between the master axis and the slave axis is low.

The present invention can provide a servomotor control apparatus capable of adjusting an integral value of a speed integrator, while maintaining the controllability in relation to a driven object.

DETAILED DESCRIPTION OF THE INVENTION

Embodiments of the present invention are hereinafter described with reference to the drawings. In the following descriptions, three embodiments are described as an example of the embodiments of the present invention. An outline of the three embodiments is described herein. A first embodiment is an embodiment in which one driven object is driven by way of one master axis and one slave axis. Moreover, a second embodiment is an embodiment in which one driven object is driven by way of one master axis and a plurality of slave axes, increasing the slave axis in number. Further, a third embodiment is an embodiment which is additionally provided with a function to adjust a low-pass filter, based on a result of estimating mechanical coupling rigidity between a driven object and both axes of a master-axis side and a slave-axis side.

First Embodiment

Figure 1:
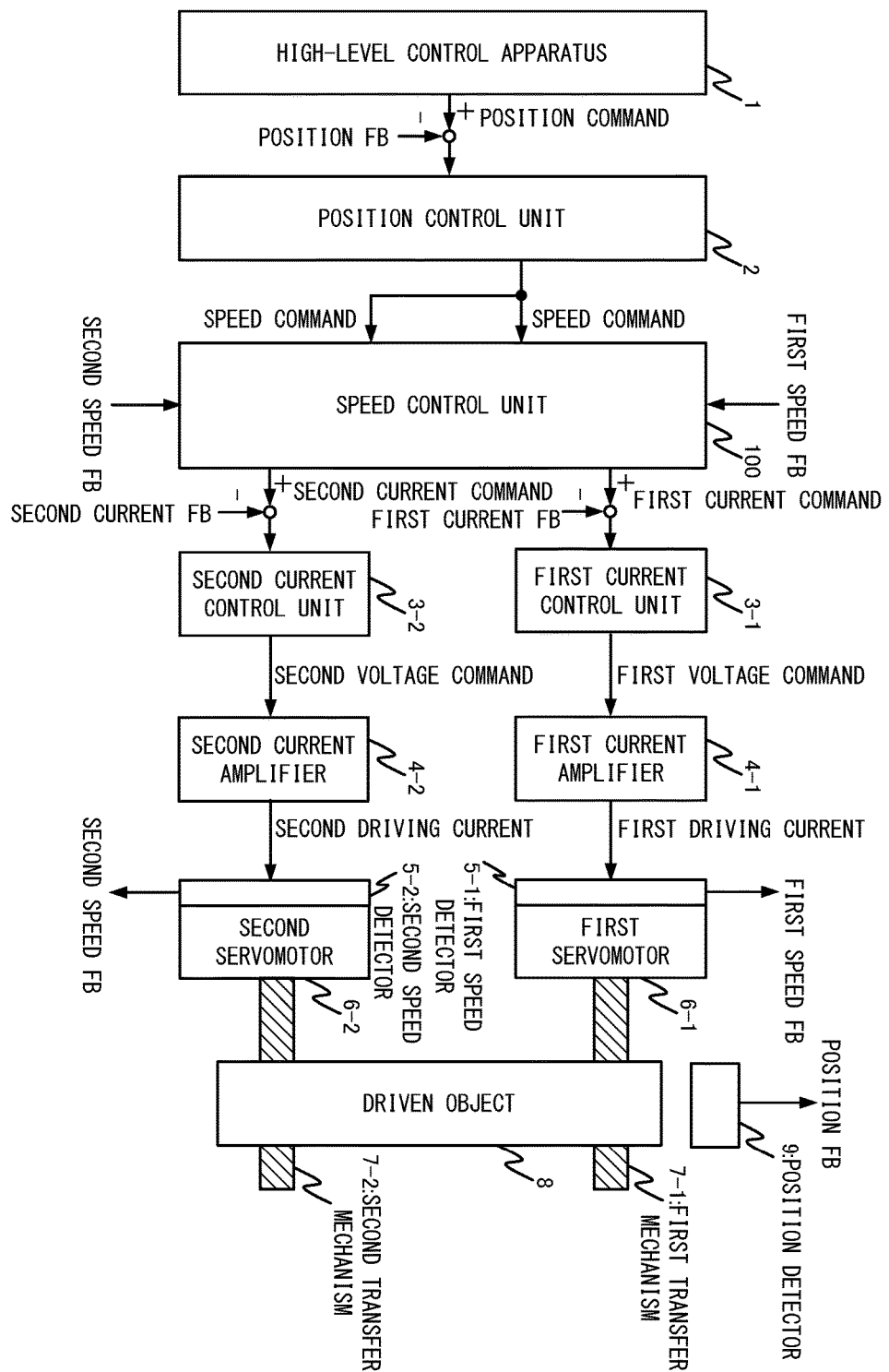
FIG. 1 is a block diagram illustrating a total configuration according to a first embodiment of the present invention.

At first, the first embodiment is described. As illustrated in FIG. 1, the present embodiment includes a high-level control apparatus 1, a position control unit 2, a speed control unit 100, a first current control unit 3-1, a first current amplifier 4-1, a first speed detector 5-1, a first servomotor 6-1, a first transfer mechanism 7-1, a second current control unit 3-2, a second current amplifier 4-2, a second speed detector 5-2, a second servomotor 6-2, a second transfer mechanism 7-2, a driven object 8, and a position detector 9.

The present embodiment performs tandem control of a drive mechanism for driving one driven object 8 by way of two servomotors including a first servomotor 6-1 and a second servomotor 6-2. Further, in accordance with this, the speed control unit 100 performs processing that is characteristic of the present embodiment, thereby correcting an integral value of a speed integrator of the slave axis, while maintaining the controllability of the driven object. Note that, in the following descriptions, the first servomotor 6-1 is treated as a master-side servomotor, and the second servomotor 6-2 is treated as a slave-side servomotor.

The high-level control apparatus 1 outputs a position command to a servomotor on each axis for each predetermined cycle based on an operation program or the like; or outputs a move command MCMD, which is the difference from the position command, to the position control unit 2. In the present embodiment, tandem control is performed on the first servomotor 6-1 and the second servomotor 6-2, in which the position command or the move command MCMD for these two servomotors takes the same value. Each unit downstream of the position control unit 2 reads the position command or the move command MCMD, performs position control, speed control and current control for each predetermined cycle, and drives the first servomotor 6-1 and the second servomotor 6-2 via the first current amplifier 4-1 and the second current amplifier 4-2. Note that the high-level control apparatus 1 can be implemented by, for example, Computer Numerical Control (CNC). Further, the following description assumes that the high-level control apparatus 1 outputs a position command.

A subtractor is arranged between the high-level control apparatus 1 and the position control unit 2; and the subtractor subtracts a position feedback amount (in the drawings, the feedback amount is simply denoted with "FB"), which is detected by way of the position detector 9 to be described later, from the position command that is output from the high-level control apparatus 1. The subtractor outputs a post-subtraction value to the position control unit 2. Here, such a post-subtraction value serves as a position deviation amount. The position control unit 2 processes the position deviation amount to generate a speed command, and outputs the speed command generated to the speed control unit 100. In this case, the output speed command is bifurcated and input into the speed control portions of the master axis side and the slave axis side, respectively, inside the speed control unit 100. In this manner, in the present embodiment, since a common speed command is output to both of the master axis side and the slave axis side, only one position detector 9 is arranged, and subtraction is performed based on a position feedback amount detected by way of the one position detector 9. However, this is not intended to restrict the position detector 9 to only one; however, a plurality of position detectors 9 may be arranged, for any arbitrary purpose.

The speed control unit 100 performs speed loop processing, such as receiving a speed command from the position control unit 2, and performing proportion computation and integration computation based on the speed deviation amount, which is obtained by subtracting the first speed feedback amount detected by way of a first speed detector 5-1 to be described later, from the speed command, thereby outputting a first current command that is a current command for the master axis side. Similarly, the speed control unit 100 performs speed loop processing, such as receiving a speed command from the position control unit 2, and performing proportion computation and integration computation based on the speed deviation amount, which is obtained by subtracting the second speed feedback amount detected by way of a second speed detector 5-2 to be described later, from the speed command, thereby outputting a second current command that is a current command for the slave axis side. Note that a current command may also be referred to as a torque command. Further, in addition to performing such speed loop processing, the speed control unit 100 performs processing that is characteristic of the present embodiment, thereby adjusting the integrated value of the slave axis side. This feature is one of the subject matters of the present embodiment, and will be described in detail with reference to the functional block diagram in FIG. 2 and the flow charts in FIGS. 3 and 4, after completing the present description with reference to FIG. 1.

A subtractor is arranged between the speed control unit 100 and each of the first current control unit 3-1 and the second current control unit 3-2; and the subtractor subtracts a current feedback amount, which is provided from a sensor (illustration omitted) for detecting a motor current of each servomotor, from the first current command and the second current command. Specifically, the first current feedback amount, which is a motor current of the first servomotor 6-1, is subtracted from the first current command. The subtractor outputs a post-subtraction value to the first current unit 3-1. Further, similarly, the second current feedback amount, which is a motor current of the second servomotor 6-2, is subtracted from the second current command. The subtractor outputs a post-subtraction value to the second current control unit 3-2. These post-subtraction values each serve as a current deviation amount. The first current control unit 3-1 processes the current deviation amount received to generate a first voltage command, and outputs the first voltage command generated to the first current amplifier 4-1. Further, similarly, the second current control unit 3-2 processes the current deviation amount received to generate a second voltage command, and outputs the second voltage command generated to the second current amplifier 4-2.

The first current amplifier 4-1 forms a driving current for driving the first servomotor 6-1 based on the first voltage command received, and uses this driving current to drive the first servomotor 6-1. Further, similarly, the second current amplifier 4-2 forms a driving current for driving the second servomotor 6-2 based on the second voltage command received, and uses this driving current to drive the second servomotor 6-2.

Here, the first transfer mechanism 7-1 connected to the first servomotor 6-1, and the second transfer mechanism 7-2 connected to the second servomotor 6-2, are each connected to the driven object 8; and a resultant force of output torque of these two motors drives the driven object 8. For example, the first transfer mechanism 7-1 and the second transfer mechanism 7-2 can be implemented by pole screws; and the pole screws are threadedly engaged with ball nuts attached to the driven object 8, thereby allowing for implementing the connection with the driven object 8. Further, each of the first servomotor 6-1 and the second servomotor 6-2 can be implemented by, for example: a rotary servomotor including a permanent magnet in at least one of a rotor and a stator; a linear servomotor including a permanent magnet in at least one of a stator and a slider; a vibrating servomotor including a permanent magnet in at least one of a stator and a vibrator; an induction motor without any permanent magnet; etc. Further, the driven object 8 can be implemented by, for example, a table of a machine tool, an arm of an industrial robot, etc.

On the other hand, the first speed detector 5-1 is attached to the first servomotor 6-1; and a first speed feedback amount detected by way of the first speed detector 5-1 is output to the speed control portion of the master axis side of the speed control unit 100. Furthermore, similarly, the second speed detector 5-2 is attached to the second servomotor 6-2; and a second speed feedback amount detected by way of the second speed detector 5-2 is output to the speed control portion of the slave axis side of the speed control unit 200.

The position detector 9 is arranged to allow detecting a position of the driven object 8 of the first servomotor 6-1 side. However, depending on the conditions such as rigidity, instead of being attached to the driven object 8, the position detector 9 may be provided to the output axis of the first servomotor 6-1. Namely, the position detector 9 may be attached to the driven object so as to directly detect movement of the driven object, or may be attached to the output axis or the like of the motor, and detect a rotational position of the motor, thereby detecting a position of the driven object. Furthermore, the position detector 9 may be configured on a linear scale, for example, or may be composed of a rotary encoder.

The configuration described above with reference to FIG. 1 allows for reading the position command or the move command MCMD from the high-level control apparatus 1, performing position control, speed control and current control for each predetermined cycle, and driving the first servomotor 6-1 and the second servomotor 6-2 via the first current amplifier 4-1 and the second current amplifier 4-2.

Figure 2:
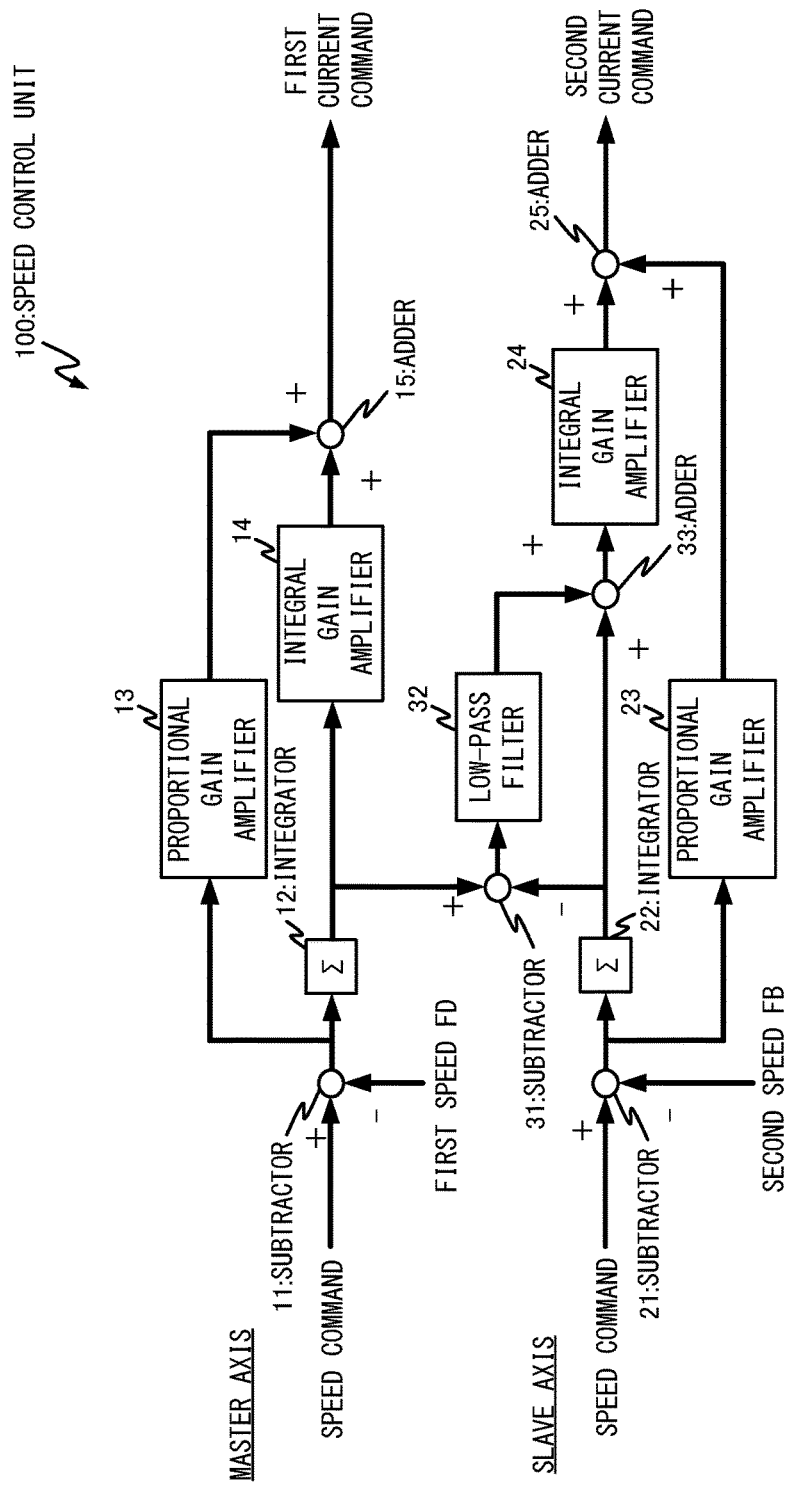
FIG. 2 is a block diagram illustrating a configuration of a speed control unit according to the first embodiment of the present invention.
Figure 3:
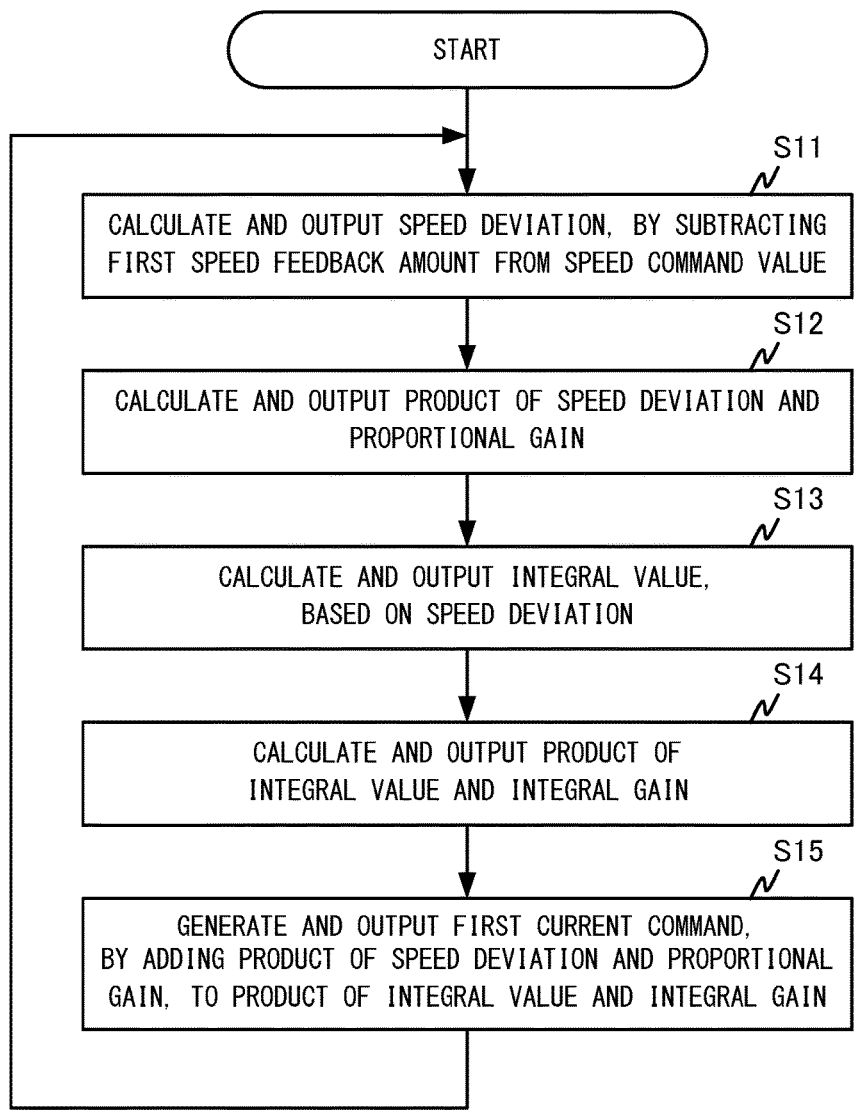
FIG. 3 is a flow chart illustrating an operation of a master axis according to each embodiment of the present invention.
Figure 4:
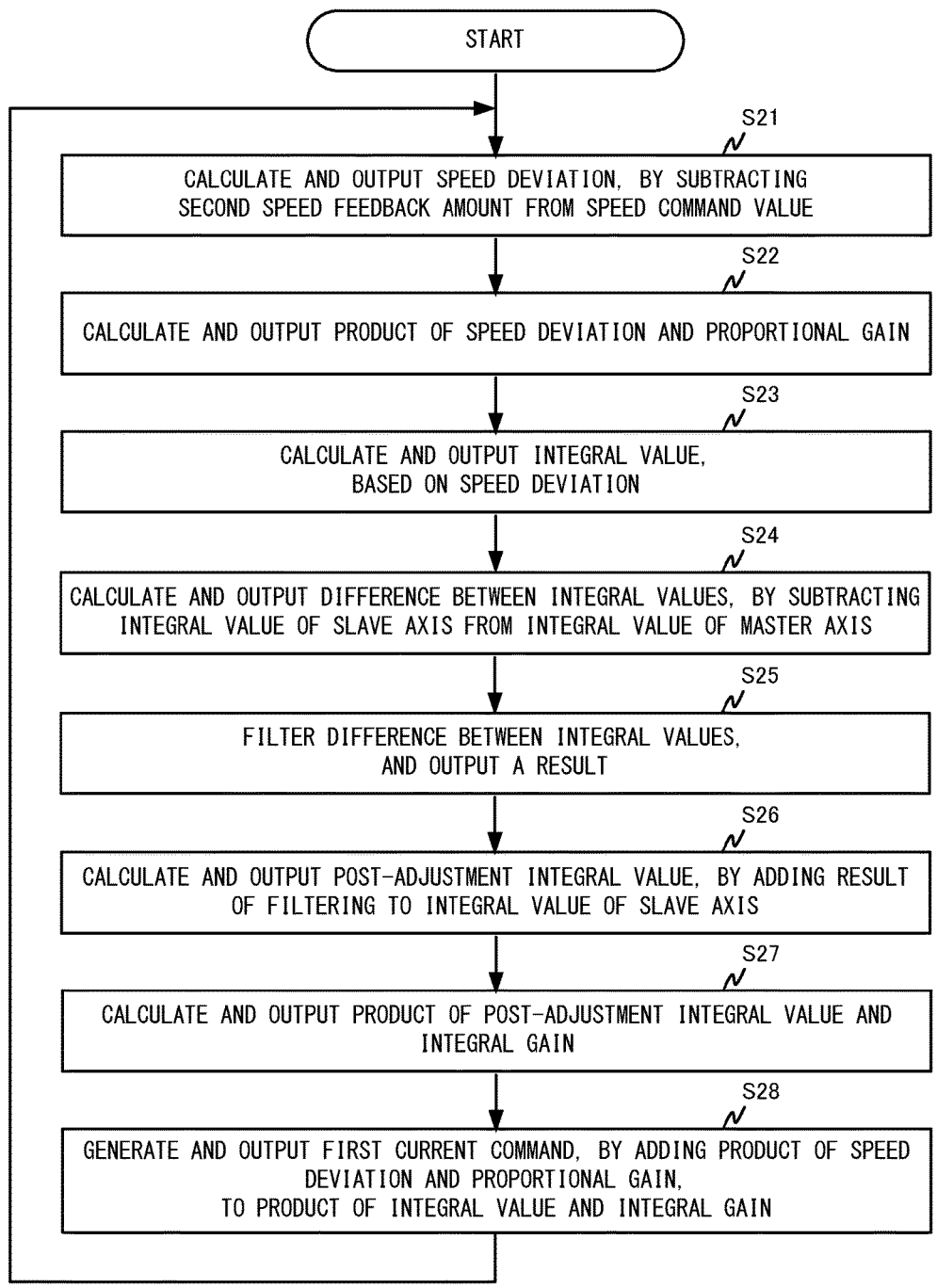
FIG. 4 is a flow chart illustrating an operation of a slave axis according to each embodiment of the present invention.

Next, a configuration of the speed control unit 100 and processing performed by the speed control unit 100 are described with reference to the functional block diagram in FIG. 2 and the flow charts in FIGS. 3 and 4. Here, as illustrated in FIG. 2, the speed control unit 100 includes a subtractor 11, an integrator 12, a proportional gain amplifier 13, an integral gain amplifier 14, and an adder 15, which are the speed control portion of the master axis side. Further, the speed control unit 100 includes a subtractor 21, an integrator 22, a proportional gain amplifier 23, an integral gain amplifier 24, and an adder 25, which are the speed control portion of the slave axis side. The speed control unit 100 further includes a subtractor 31, a low-pass filter 32, and an adder 33, which are the configuration for adjusting the integral value of the slave axis side. The speed control unit 100 performs PI control, thereby generating a current command.

Next, in relation to the processing by each of these components, an operation of the speed control portion of the master axis side is described with reference to FIG. 3.

At first, the subtractor 11 subtracts the first speed feedback amount from the speed command value, thereby calculating speed deviation of the master axis side. The subtractor 11 outputs the speed deviation of the master axis side calculated to the integrator 12 and the proportional gain amplifier 13 (Step S11).

Next, the proportional gain amplifier 13 calculates a product of the speed deviation of the master axis side input and the proportional gain for amplifying this speed deviation, and outputs a calculation result to the adder 15 (Step S12). It is assumed herein that the value of the proportional gain is set up in advance in the proportional gain amplifier 13.

On the other hand, the integrator 12 performs integration, based on the speed deviation of the master axis side input, thereby calculating an integral value of the speed deviation of the master axis side. The integral value of the speed deviation of the master axis side calculated is output to the integral gain amplifier 14 and the subtractor 31 (Step S13).

Next, the integral gain amplifier 14 calculates a product of the integral value of the speed deviation of the master axis side input and the integral gain for amplifying this integral value, and outputs a calculation result to the adder 15 (Step S14). It is assumed herein that the value of the integral gain is set up in advance in the integral gain amplifier 14. Note that, for the purpose of illustration, descriptions are provided such that Step S12 is performed and Steps S13 and S14 are subsequently performed; however, in practice, Steps S12, S13 and S14 are performed in parallel at the same timing.

The adder 15 adds the product of the speed deviation and the proportional gain of the master axis side thus input, to the product of the integral value of the speed deviation of the master axis side and the integral gain thus input, thereby generating the first current command. The adder 15 outputs the first current command generated to the first current control unit 3-1 (Step S15). As described above, the first electric current feedback amount is subtracted from the first current command output, by way of the subtractor between the speed control unit 100 and the first current control unit 3-1, and is input into the first current control unit 3-1.

Next, an operation of the speed control portion of the slave axis side, and an adjustment operation for an integral value performed by the subtractor 31, the low-pass filter 32 and the adder 33, are described with reference to FIG. 4.

At first, the subtractor 21 subtracts the second speed feedback amount from the speed command value, thereby calculating speed deviation of the master axis side. The subtractor 22 outputs the speed deviation of the master axis side calculated to the integrator 22 and the proportional gain amplifier 23 (Step S21). Note that, although a description has been made above in relation to the position control unit 2, the speed command to be input into the subtractor 11 is identical to the speed command to be input into the subtractor 21.

Next, the proportional gain amplifier 23 calculates a product of the speed deviation of the slave axis side input and the proportional gain for amplifying this speed deviation, and outputs a calculation result to the adder 25 (Step S22).

It is assumed herein that the value of the proportional gain is set up in advance in the proportional gain amplifier 23.

On the other hand, the integrator 22 performs integration, based on the speed deviation of the slave axis side input, thereby calculating an integral value of the speed deviation of the slave axis side. The integral value of the speed deviation of the slave axis side calculated is output to the integral gain amplifier 24 and the subtractor 31 (Step S23). The subtractor 31 subtracts the integral value of the slave axis, which is input from the integrator 22, from the integral value of the master axis, which is input from the integrator 12, thereby calculating difference between the integral values calculated, and outputting the difference to the low-pass filter 32 (Step S24).

The low-pass filter 32 filters the difference between the integral values input, so as to pass the frequencies lower than the cutoff frequency determined by the time constant of the filter, and attenuate the frequencies higher than the cutoff frequency. A result of the filtering is output to the adder 33 (Step S25).

Here, the cutoff frequency determined by the time constant of the low-pass filter 32 may be determined based on mechanical coupling rigidity between the slave axis and the master axis, via the first transfer mechanism 7-1, the second transfer mechanism 7-2, and the driven object 8 (hereinafter referred to as "mechanical coupling rigidity" as appropriate).

For example, the cutoff frequency may be relatively high if the mechanical coupling rigidity is high; and the cutoff frequency may be relatively low if the mechanical coupling rigidity is low. This can be implemented by using a low-pass filter 32 having a time constant at a desired cutoff frequency. Further, instead of such a configuration, a low-pass filter 32 including an adjuster for adjusting the time constant to be a time constant at a desired cutoff frequency may be used.

Next, the adder 33 adds the result of filtering, which is input from the low-pass filter 32, to the integral value of the speed deviation of the slave axis side, which is input from the integrator 22, thereby calculating a post-adjustment integral value. The post-adjustment integral value calculated is output to the integral gain amplifier 24 (Step S26).

Next, the integral gain amplifier 24 calculates a product of the post-adjustment integral value input and the integral gain for amplifying this integral value, and outputs a calculation result to the adder 25 (Step S27). It is assumed herein that the value of the integral gain is set up in advance in the integral gain amplifier 24. Note that, for the purpose of illustration, descriptions are provided such that Step S22 is performed and Steps S23 through S26 are subsequently performed; however, in practice, Step 22 and Steps S23 through S26 are performed in parallel at the same timing.

The adder 25 adds the product of the speed deviation and the proportional gain of the slave axis side thus input, to the product of the post-adjustment integral value and the integral gain thus input, thereby generating the second current command. The adder 25 outputs the second current command generated to the second current control unit 3-2 (Step S28). As described above, the second electric current feedback amount is subtracted from the second current command output, by way of the subtractor between the speed control unit 100 and the second current control unit 3-2, and is input into the second current control unit 3-2. Note that each step illustrated in FIGS. 3 and 4 is repeatedly performed for each predetermined cycle.

In the present embodiment, such processing allows the integral value of the slave axis side to be identical to the integral value of the master axis side. However, in the present embodiment, the integral value of the slave axis side is not constantly identical to the integral value of the master axis side, unlike the technologies disclosed in Patent Documents 1 and 2. A description in this regard is provided below. As described above in relation to the low-pass filter 32, if difference between the integral values, which is input into the low-pass filter 32, is a frequency lower than the cutoff frequency, the difference between the integral values will pass the low-pass filter 32. Therefore, the adder 33 adds the difference between the integrated values to the integral value of the slave axis side, which is input from the integrator 22. Namely, the integral value of the slave axis side is adjusted to be an integral value identical to the integral value of the master axis side. On the other hand, if difference between the integral values, which is input into the low-pass filter 32, is a frequency higher than the cutoff frequency, the difference between the integral values will be attenuated by way of the low-pass filter 32. Therefore, the adder 33 does not add the difference between the integrated values to the integral value of the slave axis side, which is input from the integrator 22. Namely, the integral value of the slave axis side is not adjusted, but will be an integral value different from the integral value of the master axis side.

Here, in the cases where the driven object 8 is driven with quick acceleration or deceleration or the like by driving the first servomotor 6-1 and the second servomotor 6-2, which will increase the difference between the integral values of the master axis side and the slave axis side, if the integral value of the slave axis side is adjusted to be an integral value identical to the integral value of the master axis side, in particular, if the mechanical coupling rigidity between the slave axis and the master axis is low, "torsion" or the like may be generated in the driven object 8, and the controllability may be deteriorated. Therefore, in the present embodiment, by utilizing the low-pass filter 32, in the cases where the difference between the integral values of the slave axis side and the master axis side is large, the second current command is generated based on the integral value of the slave axis side which is output from the integrator 22, without adjusting the integral value of the slave axis side which is output from the integrator 22. As a result, if the mechanical coupling rigidity is low, "torsion" or the like can be prevented from being generated in the driven object 8, and the controllability can be prevented from being deteriorated. On the other hand, in the cases where the first servomotor 6-1 and the second servomotor 6-2 are driven slowly, or the first servomotor 6-1 and the second servomotor 6-2 are suspended, in which the difference between the integral values of the slave axis side and the master axis side is small, the integral value of the slave axis side is adjusted to be an integral value identical to the integral value of the master axis side. As a result, the integral value of the slave axis side can be adjusted so as to suppress the divergence of the integral value of the master axis side, and a problem of increasing the torque command due to divergence of the integral value can be prevented. Further, as described above, since the cutoff frequency of the low-pass filter 32 is determined in accordance with the mechanical coupling rigidity between the slave axis and the master axis, the integral value of the master axis side can be adjusted to be identical to the integral value of the slave axis side, within the range that will not generate "torsion". Therefore, the present embodiment achieves effects that, for example, the integral value of the slave axis side can be adjusted to be identical to the integral value of the master axis side; and it is possible to prevent adverse effects such as generation of "torsion" or the like, if the integral value of the slave axis side is constantly adjusted to be an integral value identical to the integral value of the master axis side.

Second Embodiment

Next, a second embodiment altered from the first embodiment is described with reference to the drawings. Here, in the first embodiment, one driven object is driven by way of one master axis and one slave axis. On the other hand, the second embodiment is different in that the slave axis is increased to N axes (N is a natural number of 2 or more), and one driven object is driven by way of one master axis and N slave axes. Note that the first embodiment and the second embodiment share the other basic configuration and processing. Thus, only the difference from the first embodiment is described below; and descriptions on the shared features, which overlap with the first embodiment, are omitted herein.

Figure 5:
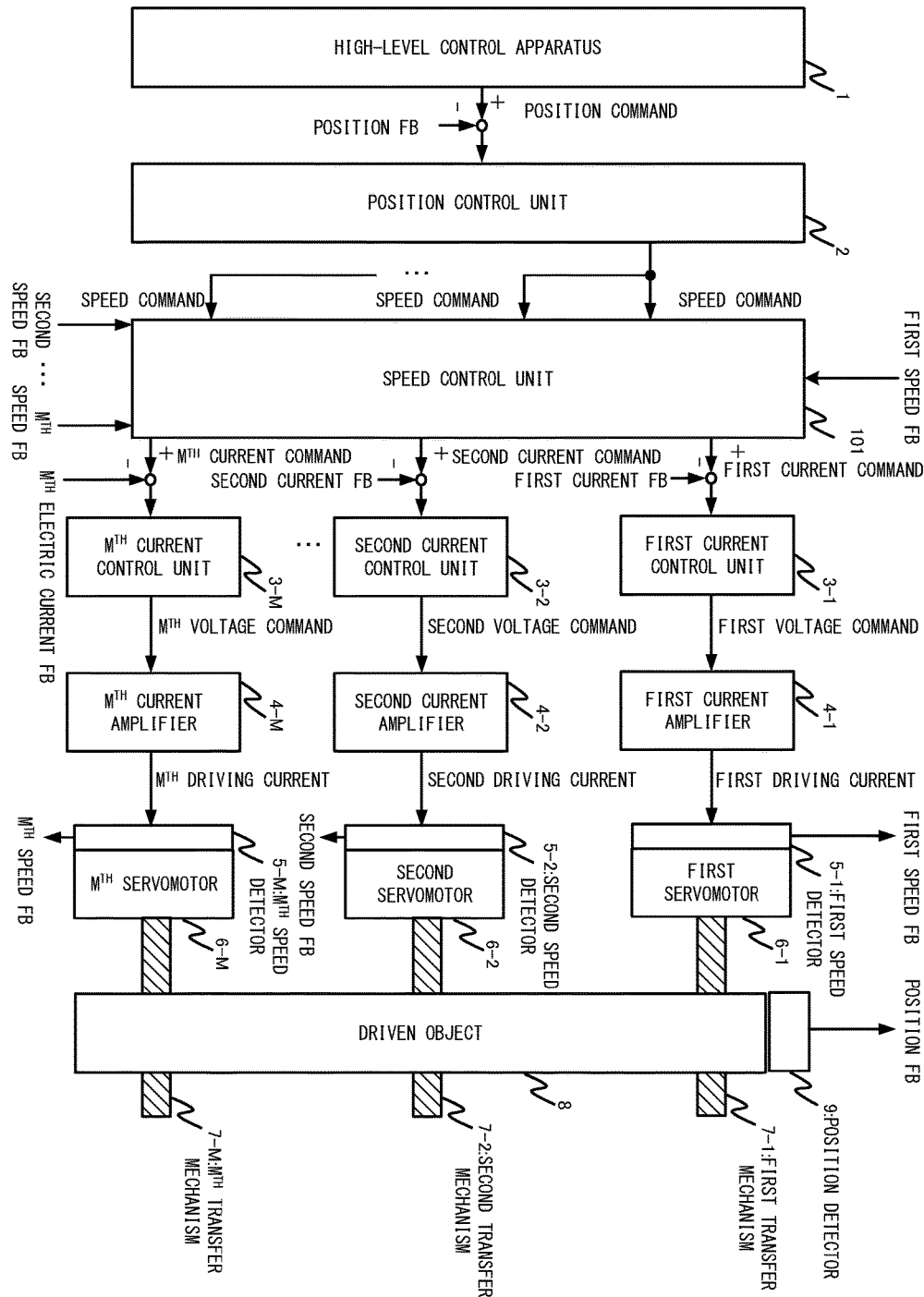
FIG. 5 is a block diagram illustrating a total configuration according to a second embodiment the present invention.

Referring now to FIG. 5, the present embodiment includes the first current control unit 3-1, the first current amplifier 4-1, the first speed detector 5-1, the first servomotor 6-1, and the first transfer mechanism 7-1, all of which correspond to the master axis; and further includes counterpart elements corresponding to the N slave axes in number. FIG. 5 illustrates an $M^{th}$ current control unit 3-M (M=N+1), an $M^{th}$ current amplifier 4-M, an $M^{th}$ speed detector 5-M, an $M^{th}$ servomotor 6-M, and an $M^{th}$ transfer mechanism 7-M. Further, correspondingly, the speed control unit 100 is replaced with a speed control unit 101. Further, the first speed feedback amount as well as the second to $M^{th}$ speed feedback amounts are input into the speed control unit 101.

Figure 6:
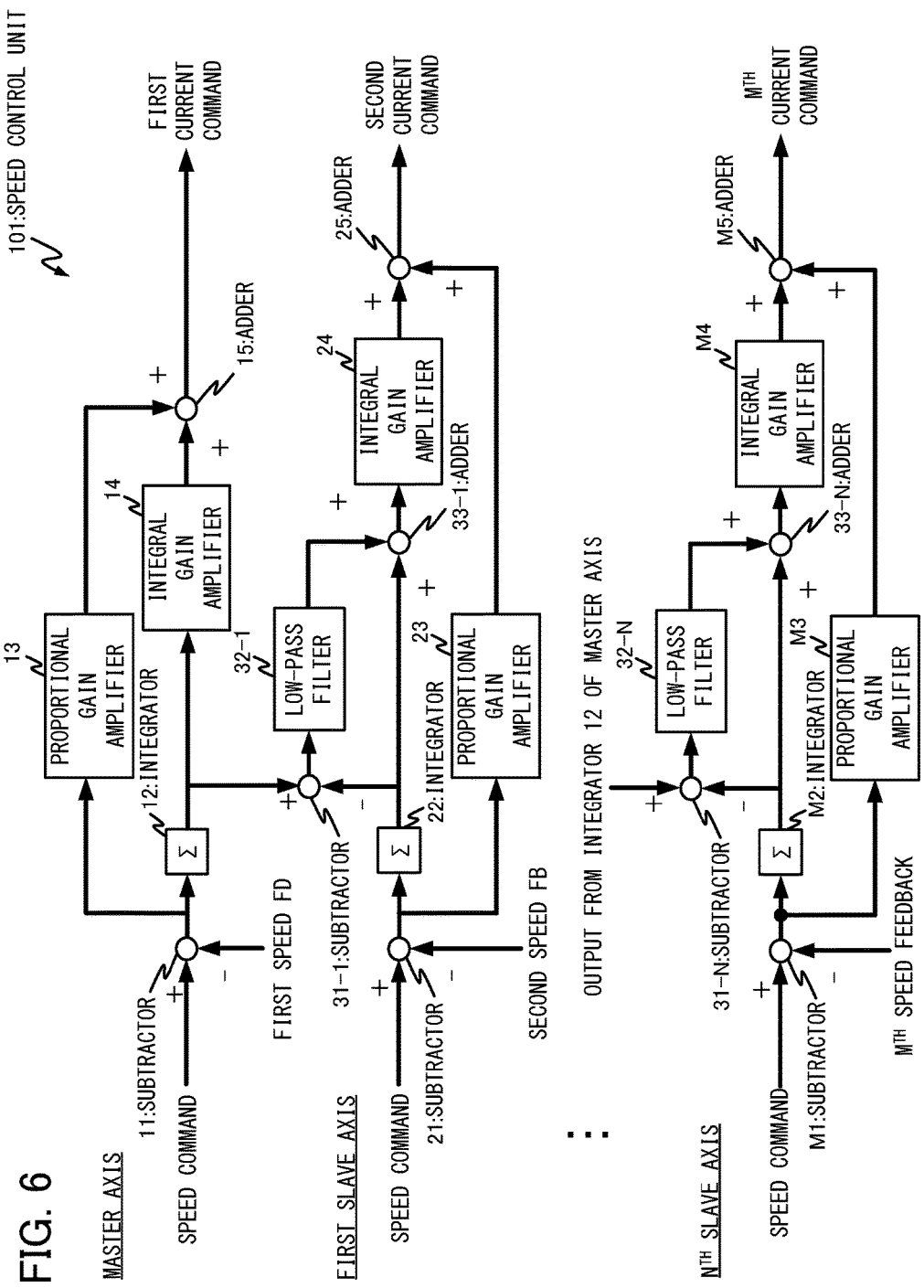
FIG. 6 is a block diagram illustrating a configuration of a speed control unit according to the second embodiment of the present invention.

Referring now to FIG. 6, a configuration of the speed control unit 101 is described. As illustrated in FIG. 6, the speed control unit 101 of the present embodiment includes the speed control portion of the master axis side, as well as speed control portions of the slave axis side corresponding to the N slave axes. FIG. 6 illustrates a subtractor M1, an integrator M2, a proportional gain amplifier M3, an integral gain amplifier M4, and an adder M5, which are the speed control portion of the slave axis side. Further, correspondingly, the speed control unit 101 includes the subtractor 31, the low-pass filter 32, and the adder 33, which are the configuration for adjusting the integral value of the slave axis side. In other words, the subtractor 31, the low-pass filter 32 and the adder 33 are provided to each of the N slave axes.

As a result, in the speed control portion of each slave axis side, the speed deviation of the slave axis can be multiplied by a proportional gain. Further, difference between the speed deviation of the slave axis and the speed deviation of the master axis can be added to the speed deviation of the slave axis, and can thereafter be multiplied by an integral gain. A current command can be calculated by adding the values obtained by such multiplication. Namely, each of the N slave axes can calculate a current command, based on the speed deviation of the slave axis, instead of the other slave axes. As a result, the present embodiment achieves an effect that enables each slave axis to perform control suitable for each slave axis.

Third Embodiment

Next, a third embodiment is described with reference to the drawings. Note that, although the third embodiment altered from the first embodiment is described below, the third embodiment may be altered from the second embodiment including the N slave axes. Here, the present embodiment additionally includes a function to estimate mechanical coupling rigidity between the slave axis and the master axis, via the first transfer mechanism 7-1, the second transfer mechanism 7-2, and the driven object 8; and adjusts the cutoff frequency determined by the time constant of the low-pass filter, based on the estimated result. Note that the present embodiment shares the other basic configuration and processing with the first and second embodiments. Thus, only the difference from the first and second embodiments is described below; and descriptions on the shared features, which overlap with the first and second embodiments, are omitted herein.

Figure 7:
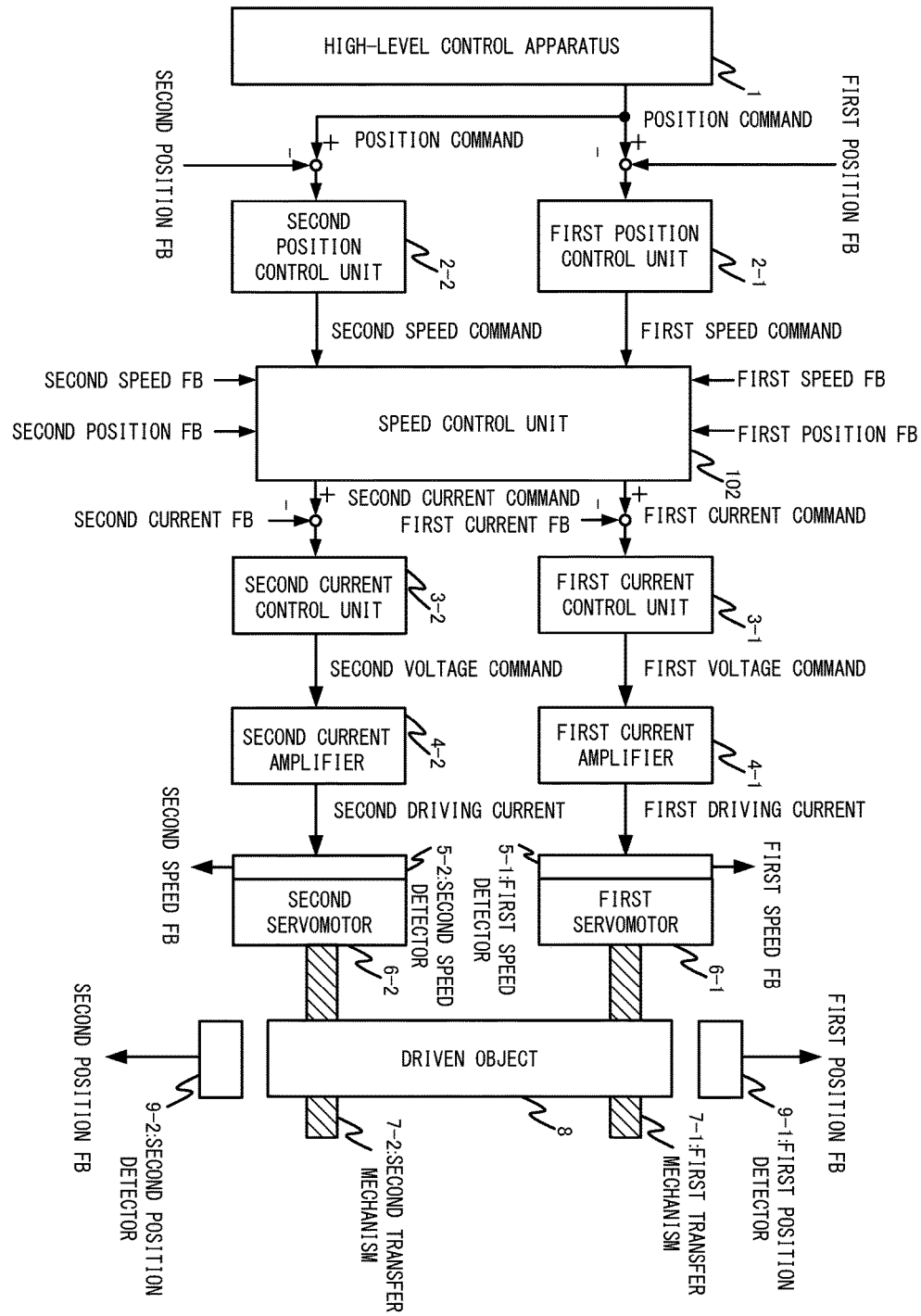
FIG. 7 is a block diagram illustrating total configuration according to a third embodiment the present invention.

Referring now to FIG. 7, in the present embodiment, the position detector 9 is also provided to the master axis side in addition to the slave axis side, in order to estimate mechanical coupling rigidity between the slave axis and the master axis. Specifically, as illustrated in FIG. 7, a first position detector 9-1 is provided as the position detector 9 of the master axis side, and a second position detector 9-2 is provided as the position detector 9 of the slave axis side. Note that the function of the first position detector 9-1 and the second position detector 9-2 is similar to that of the position detector 9. Further, the speed control unit 100 is replaced with a speed control unit 102 that additionally includes a function to estimate mechanical coupling rigidity between the slave axis and the master axis. Furthermore, corresponding to two position feedback amounts respectively detected by way of the first position detector 9-1 and the second position detector 9-2, a first position control unit 2-1 is provided as the position control unit 2 of the master axis side, and a second position control unit 2-2 is provide as the position control unit 2 of the slave axis side. Note that the function of the first position control unit 2-1 and the second position control unit 2-2 is similar to that of the position control unit 2.

In order to estimate mechanical coupling rigidity between the slave axis and the master axis, the position feedback amount detected by way of the first position detector 9-1 is input as the first position feedback amount into the speed control portion of the master axis side inside the speed control unit 102. Further, the position feedback amount detected by way of the second position detector 9-2 is input as the second position feedback amount into the speed control portion of the master axis side inside the speed control unit 102.

Further, the high-level control apparatus 1 provides a common position command to the first position control unit 2-1 and the second position control unit 2-2; a subtractor is arranged between the high-level control apparatus 1 and each of the first position control unit 2-1 and the second position control unit 2-2; and the subtractor subtracts each position feedback amount from the position command that is output from the high-level control apparatus 1. Each subtractor outputs a post-subtraction value to the first position control unit 2-1 and the second position control unit 2-2. Specifically, the subtractor of the master axis side obtains a value by subtracting the first position feedback amount from position command, and outputs this value to the first position control unit 2-1. Further, the subtractor of the slave axis side obtains a value by subtracting the second position feedback amount from the position command, and outputs this value to the second position control unit 2-2. Here, such post-subtraction values are the position deviation amount of the master axis side, and the position deviation amount of the slave axis side, respectively. The first position control unit 2-1 and the second position control unit 2-2 receive and process the position deviation amounts, generate speed commands, and output speed commands generated to the speed control unit 100. Specifically, the speed command, which is output from the first position control unit 2-1, is input as the first speed command into the speed control portion of the master axis side inside the speed control unit 102. Further, the speed command, which is output from the second position control unit 2-2, is input as the second speed command into the speed control portion of the slave axis side inside the speed control unit 102.

Note that, instead of the configuration illustrated in FIG. 7, a common speed command may be shared by the master axis side and the slave axis side in the present embodiment as well. In other words, instead of providing the first position control unit 2-1 and the second position control unit 2-2, one position control unit 2 is provided, similar to the first and second embodiments. A value may be obtained by subtracting any one of the first position feedback amount or the second feedback amount from the position command that is output from the high-level control apparatus 1; and only this value may be input into the position control unit 2, such that a common speed command may be shared by the master axis side and the slave axis side.

Figure 8:
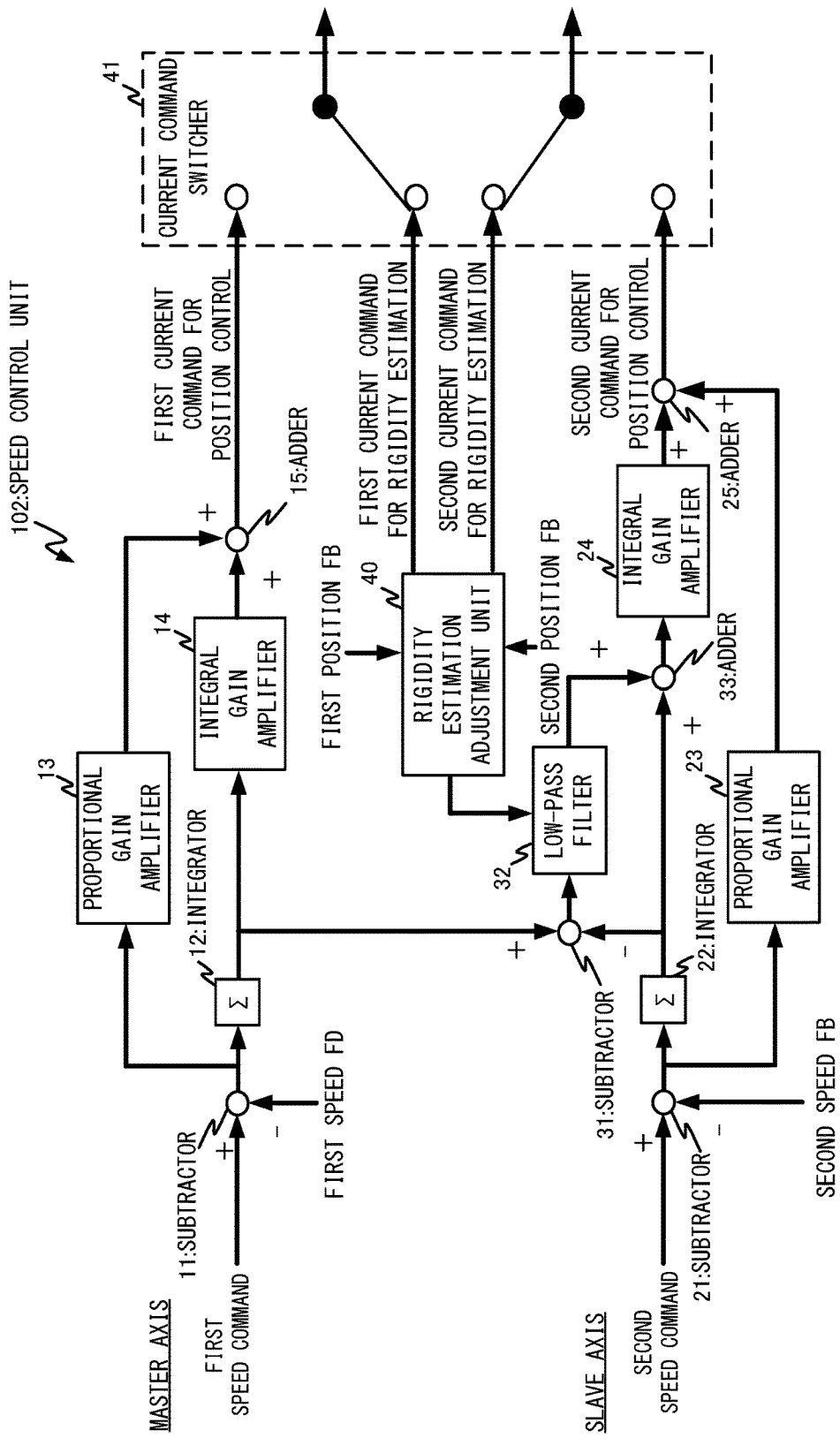
FIG. 8 is a block diagram illustrating a configuration of a speed control unit according to the third embodiment of the present invention.

Referring now to FIG. 8, a configuration of the speed control unit 102 is described. As illustrated in FIG. 8, the speed control unit 102 further includes a rigidity estimation adjustment unit 40 and a current command switcher 41, in addition to the configuration of the speed control unit 100. The rigidity estimation adjustment unit 40 estimates mechanical coupling rigidity between the slave axis and the master axis, and adjusts a cutoff frequency determined by the time constant of the low-pass filter 32, based on the mechanical coupling rigidity estimated. The current command switcher 41 is a switch for switching the first current command, which is output from speed control unit 102 to the first current control unit 3-1, to any one of: the first current command for position control which is output from the adder 15; or the first current command for rigidity estimation which is output from the rigidity estimation adjustment unit 40. Further, similarly, the current command switcher 41 switches the second current command, which is output from speed control unit 102 to the second current control unit 3-2, to any one of: the second current command for position control which is output from the adder 25; or the fourth current command for rigidity estimation which is output from the rigidity estimation adjustment unit 40.

Note that, although the first current command for position control is the same as the first current command in the first and second embodiments, the phrase "for position control" is added for the purpose of convenience, in order to be distinguished from the first current command for rigidity estimation which is output from the rigidity estimation adjustment unit 40. Although the second current command for position control is the same as the second current command in the first and second embodiments, the phrase "for position control" is added for the purpose of convenience, for a similar reason.

A description is now made of a method for estimating mechanical coupling rigidity between the slave axis and the master axis by way of the rigidity estimation adjustment unit 40. The rigidity estimation adjustment unit 40 estimates, for example, torsional rigidity as mechanical coupling rigidity between the slave axis and the master axis. In this regard, the method of estimating torsional rigidity can be performed by way of, for example, a method disclosed in Patent Document 3.

Specifically, in order to estimate rigidly by blocking the position control, the rigidity estimation adjustment unit 40 switches the current command switcher 41 to output the first current command for rigidity estimation and the second current command for rigidity estimation, instead of the first current command for position control and the second current command for position control. Here, the first current command for rigidity estimation and the second current command for rigidity estimation are a current command for causing torsion in the driven object 8, and are a current command based on, for example, sine-wave measurement torque at a particular frequency. When the first servomotor 6-1 and the second servomotor 6-2 are driven by the first current command for rigidity estimation and the second current command rigidity estimation, the driven object 8 is accordingly driven, and torsion is caused in the driven object 8. In this case, the first position feedback amount and the second position feedback amount, which are detected by way of the first position detector 9-1 and the second position detector 9-2, are input into the rigidity estimation adjustment unit 40.

The rigidity estimation adjustment unit 40 estimates a torsional rigidity value of the driven object 8, based on a torsion angle of the driven object 8 calculated based on a value of difference between the first position feedback amount and the second position feedback amount, and each value of the first current command for rigidity estimation and the second current command rigidity. The cutoff frequency determined by the time constant of the low-pass filter 32 is adjusted, based on the torsional rigidity value estimated. Here, in relation to the criterion for adjustment, as described above in the first embodiment, for example, the cutoff frequency may be relatively high if the mechanical coupling rigidity is high; and the cutoff frequency may be relatively low if the mechanical coupling rigidity is low.

As a result, in the present embodiment, the cutoff frequency can be adjusted based on the mechanical coupling rigidity such as torsional rigidity estimated. Therefore, the present embodiment achieves an effect that can prevent torsion from being generated when the integral value of the slave axis is identical to the integral value of the master axis due to an inappropriate value of the cutoff frequency.

The embodiments of the present invention are described above. Although the above-described embodiments are the preferred embodiments of the present invention; the scope of the present invention shall not be restricted only to the above-described embodiments; and the present invention can be implemented in aspects with various alterations within a scope without departing from the spirit of the present invention.

The embodiments described above can be implemented by hardware, software or a combination thereof. Herein, the implementation by software means implementation by a computer that reads and executes a program. When configured with hardware, part or all of the embodiments can be configured with, for example, an integrated circuit (IC) such as LSI (Large Scale Integrated Circuit), ASIC (Application Specific Integrated Circuit), gate array, and FPGA (Field Programmable Gate Array).

In the case in which part or all of the embodiments is configured with a combination of software and hardware, a computer is configured with: a storage unit such as a hard disk and ROM which store a program describing all or part of the operations of the servo control apparatus illustrated in the flowchart; DRAM which store data necessary for computation; CPU; and a bus which connects each unit; in which information necessary for computation is stored in the DRAM, and the program is operated in the CPU, whereby all or part of the functions can be realized. A program is stored by using various types of computer-readable media, and can be supplied to a computer. The computer-readable media include various types of tangible storage media. Examples of the computer-readable media include: a magnetic recording medium (e.g. flexible disk, magnetic tape, hard disk drive), a magneto-optical recording medium (e.g. magneto-optical disk), CD-ROM (Read Only Memory), CD-R, CD-R/W, semiconductor memory (e.g. Mask ROM, PROM (Programmable ROM), EPROM (Erasable PROM), flash ROM, and RAM (random access memory)).

EXPLANATION OF REFERENCE NUMERALS

1: high-level control apparatus
2: position control unit
2-1: first position control unit
2-2: second position control unit
3-1: first current control unit
3-2: second current control unit
3-M: $M^{th}$ current control unit
4-1: first current amplifiers
4-2: second current amplifiers
4-M: $M^{th}$ current amplifier
5-1: first speed detector
5-2: second speed detector
5-M: $M^{th}$ speed detector
6-1: first servomotor
6-2: second servomotor
6-M $M^{th}$ servomotor
-1: first transfer mechanism
7-2: second transfer mechanism
7-M: $M^{th}$ transfer mechanism
8: driven object
9: position detector
11, 21, 31, M1: subtractor 12, 22, M2: integrator
13, 23, M3: proportional gain amplifier
14, 24, M4: integral gain amplifier
15, 25, M5, 33: adder
32: low-pass filter
40: rigidity estimation adjustment unit
41: current command switcher
100, 101, 102: speed control unit

What is claimed is:

1. A servo control apparatus that performs control for driving one driven object by way of a master-axis motor on a master axis and a slave-axis motor on a slave axis, the apparatus comprising:
   a subtractor that calculates a difference between an integral value of a speed deviation of the master axis and an integral value of a speed deviation of the slave axis;
   a low pass filter that performs filtering of the difference;
   an adder that adds a result of the filtering to the integral value of the speed deviation of the slave axis to produce an addition result; and
   a CPU that estimates a torsional rigidity value of the driven object, based on a torsion angle of the driven object calculated based on a value of difference between a position feedback amount of the master axis and a position feedback amount of the slave axis, and each value of the first current command for rigidity estimation of the master axis and the second current command for rigidity estimation of the slave axis, wherein
   a current command for driving the master-axis motor is calculated for the master axis by using the integral value of the speed deviation of the master axis;
   a current command for driving the slave-axis motor is calculated for the slave axis by using the addition result of the adder; and
   a cutoff frequency of the low-pass filter is adjusted based on an estimated result of the CPU.

2. The servo control apparatus according to claim 1, further comprising:
   a master axis control unit corresponding to the master-axis motor, wherein the master axis control unit calculates speed deviation of the master-axis motor, based on a speed command being common to the master axis and the slave axis, and speed feedback of the master-axis motor; and the master axis control unit calculates a sum of (i) value obtained by multiplying a proportional gain by the calculated speed deviation, and (ii) a value obtained by multiplying an integral gain by the integral value of the speed deviation of the master axis which is obtained by integrating the calculated speed deviation, as the current command for driving the master axis motor; and
   a slave axis control unit corresponding to the slave-axis motor, wherein the slave axis control unit calculates speed deviation of the slave-axis motor, based on a speed command being common to the master axis and the slave axis, and speed feedback of the slave axis motor; and the slave axis control unit calculates a sum of (i) a value obtained by multiplying a proportional gain by the calculated speed deviation, and (ii) a value obtained by multiplying an integral gain by the output of the adder, as the current command for driving the slave axis motor.

3. The servo control apparatus according to claim 1, wherein
   the slave axis includes N slave axes (N is a natural number of 2 or more);
   the apparatus comprises N of the subtractor, N of the low pass filter, and N of the adder, corresponding to the N slave axes;
   each of the N subtractors calculates a difference between the integral value of speed deviation of the master axis and the integral value of the slave axis corresponding to the subtractor;
   each of the N low pass filters performs filtering of the difference in relation to the slave axis corresponding to the low pass filter;
   each of the N adders adds a result of the filtering of the slave axis corresponding to the adder, to the integral value of the slave axis corresponding to the adder;
   whereby a current command for driving the slave-axis motor is calculated for each of the N slave axes by using an integral value after addition by the adder corresponding to the slave axis.

4. The servo control apparatus according to claim 1, wherein the cutoff frequency of the low-pass filter is adjusted to be high when the torsional rigidity value of the driven object estimated by the estimation unit is high; and the cutoff frequency of the low-pass filter is adjusted to be low when torsional rigidity value of the driven object estimated by the estimation unit is low.

* * * * *